United States Patent
Kyoden

(10) Patent No.: US 7,298,061 B2
(45) Date of Patent: Nov. 20, 2007

(54) MOTOR DRIVING UNIT AND VEHICLE-DOOR MIRROR

(75) Inventor: Tatsuo Kyoden, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 421 days.

(21) Appl. No.: 11/012,716

(22) Filed: Dec. 16, 2004

(65) Prior Publication Data

US 2005/0168853 A1 Aug. 4, 2005

(30) Foreign Application Priority Data

Dec. 24, 2003 (JP) ............... 2003-427572

(51) Int. Cl.
*H02K 1/02* (2006.01)
*B60R 1/62* (2006.01)

(52) U.S. Cl. .............. 310/68 R; 310/51; 359/872; 359/873

(58) Field of Classification Search ........ 310/68 R, 310/51, 98; 359/841, 872, 877, 881, 873; 361/27
See application file for complete search history.

(56) References Cited

U.S. PATENT DOCUMENTS

| | | | | |
|---|---|---|---|---|
| 4,143,288 A | * | 3/1979 | Sato | .............. 310/66 |
| 5,039,964 A | * | 8/1991 | Ikeda | ........... 333/181 |
| 5,362,257 A | * | 11/1994 | Neal et al. | ............ 439/676 |
| 5,793,171 A | | 8/1998 | Hayashi et al. | |
| 6,268,669 B1 | * | 7/2001 | Wakao et al. | .......... 310/67 R |
| 6,661,134 B2 | * | 12/2003 | Sunaga et al. | ............. 310/64 |
| 6,679,610 B2 | | 1/2004 | Yamauchi | |
| 6,713,913 B1 | * | 3/2004 | Hager et al. | ........... 310/89 |
| 6,762,656 B1 | * | 7/2004 | Kobayashi et al. | ......... 333/184 |
| 6,831,381 B2 | * | 12/2004 | Ursel et al. | ............ 310/75 R |
| 2003/0107340 A1 | | 6/2003 | Kurita et al. | |
| 2006/0255756 A1 | * | 11/2006 | Iwata et al. | ............ 318/254 |

FOREIGN PATENT DOCUMENTS

| JP | 2557691 Y2 | | 8/1997 |
|---|---|---|---|
| JP | 9223940 A | * | 8/1997 |
| JP | 11-206164 A | | 7/1999 |
| JP | 2000-340903 A | | 12/2000 |

* cited by examiner

*Primary Examiner*—Tran Nguyen
(74) *Attorney, Agent, or Firm*—Foley & Lardner LLP

(57) ABSTRACT

A motor driving unit includes an electric motor and a motor drive control circuit board that is disposed in a position facing the electric motor at a predetermined distance from the electric motor. A pseudo condenser is formed by providing a conductor pattern at a position facing the electric motor, in the motor drive control circuit board.

10 Claims, 12 Drawing Sheets

MOTOR DRIVING UNIT AND VEHICLE-DOOR MIRROR

CROSS-REFERENCE TO RELATED APPLICATIONS

The present document incorporates by reference the entire contents of Japanese priority document, 2003-427572 filed in Japan on Dec. 24, 2003.

BACKGROUND OF THE INVENTION

1. Field of the Invention

The present invention relates to a motor driving unit that that drives an object with the help of a driving force of an electric motor, and a vehicle-door mirror that is equipped with the motor driving unit.

2. Description of the Related Art

Motor driving units that drive objects with the help of driving forces of electric motors are know. Such motor driving units include a driving force transmission mechanism that transmits the driving force of the electric motor to the object, and a control circuit that control, such as switching off power supply to the electric motor, the electric motor. Such motor driving units are used in powered retractable door mirrors and power windows of vehicles.

A conventional motor driving unit is shown in FIG. 10. It is assumed here that,the motor driving unit is used in a powered retractable door mirror (hereinafter, "door mirror") of a vehicle.

As shown in FIG. 10, the door mirror includes a mirror base 1, a shaft holder 2, a motor driving unit 3A, and a mirror assembly that is the object to be driven by the motor driving unit 3A. The mirror base 1 is fixed to a door (not shown) of a vehicle. The shaft holder 2 holds a shaft 21 and is fixed to the mirror base 1. The motor driving unit 3A is rotatably pivoted by the shaft 21.

The mirror assembly includes a housing 4, a fixing bracket 5 that includes a power unit etc., and a mirror 6. The mirror assembly is rotatably pivoted by the shaft 21 via the motor driving unit 3A.

The motor driving unit 3A includes an electric motor 33, a clutch mechanism 35, and a speed reduction mechanism (driving force transmission mechanism) 36. The clutch mechanism 35 transmits the driving force of the electric motor 33 to the mirror assembly. The motor driving unit 3A further includes a switching circuit (motor drive control circuit). When the mirror assembly comes to a predetermined position, the switching circuit switches off the power supply to the electric motor 33 and stops the mirror assembly at a standing position (in-use position) or a retracted position (rearward tilted position).

As shown in FIG. 11, the switching circuit includes a first PTC (positive temperature coefficient) element PTC1, a second PTC element PTC2, a first diode D1, a second diode D2, a relay contact R-S, a start-up condenser C, a relay self-holding resistance R-R, a relay-coil R-C, and a discharge resistance RD.

The switching circuit is connected electrically to a power supply ACC (+) side and an earthing (−) side via a retraction control switch (not shown) and a harness (not shown). The retraction control switch is for switching to the standing position or to the retracted position, and is disposed in an interior of the vehicle.

When an operator operates the retraction control switch, the motor driving unit 3A is operated (by driving the electric motor 33 and operating the speed reduction mechanism 36 etc.) and the mirror assembly is moved to the standing position or the retracted position. When the mirror assembly reaches the standing position or the retracted position, the switching circuit switches off the power supply to the electric motor 33 so that the mirror assembly stops at that position.

Generally the electric motor 33 produces a high-frequency induced-noise due to a change in the amount of electric current flowing during driving (a momentary voltage fluctuation at a start-up of drive, while switching from normal rotation to reverse rotation etc.). The induced noise affects peripheral equipments. For example, if the motor driving unit is used in functional parts of the vehicle such as the powered retractable mirror and the power window, the induced noise affects equipments in the interior of the vehicle such as radio, television, and electronic control unit (ECU) that performs an engine control etc. Moreover, if the motor drive control is used as a switching device of top light in a house, it affects equipments such as radio and television in the house.

One approach to avoid the induced noise from affecting the peripheral equipment is to enclose the peripheral equipment in a casing that blocks the induced noise.

However, induced noise not only from the electric motor but also induced noises from various sources affect the peripheral equipment. For example, the relay contact R-S also produces noise. Therefore, it is necessary to block these induced noises that are in various frequency bands. The conventional technology focuses only on blocking the induced noise form one source, that is, the electric motor.

SUMMARY OF THE INVENTION

It is an object according to the present invention to solve at least the problems in the conventional technology.

A motor driving unit according to an aspect of the present invention includes an electric motor that drives an object; and a circuit board that includes a control circuit that controls driving of the electric motor. The electric motor and the circuit board are disposed with a predetermined distance therebetween in such a manner that the electric motor. Moreover, the circuit board includes a pseudo condenser in the form of a conductor pattern, wherein the pseudo condenser is disposed at a position facing the electric motor.

A powered retractable door mirror according to another aspect of the present invention includes a mirror assembly; and the above motor driving unit according to the present invention.

The other objects, features, and advantages of the present invention are specifically set forth in or will become apparent from the following detailed description of the invention when read in conjunction with the accompanying drawings.

DETAILED DESCRIPTION

Embodiments of the present invention are described below in detail with reference to accompanying drawings.

A first embodiment of the motor driving unit according to the present invention is described below with reference to FIGS. 1 to 4. It is assumed that the motor driving unit is used in a powered retractable door mirror (hereinafter, "door mirror") of a vehicle.

Figure 1A:
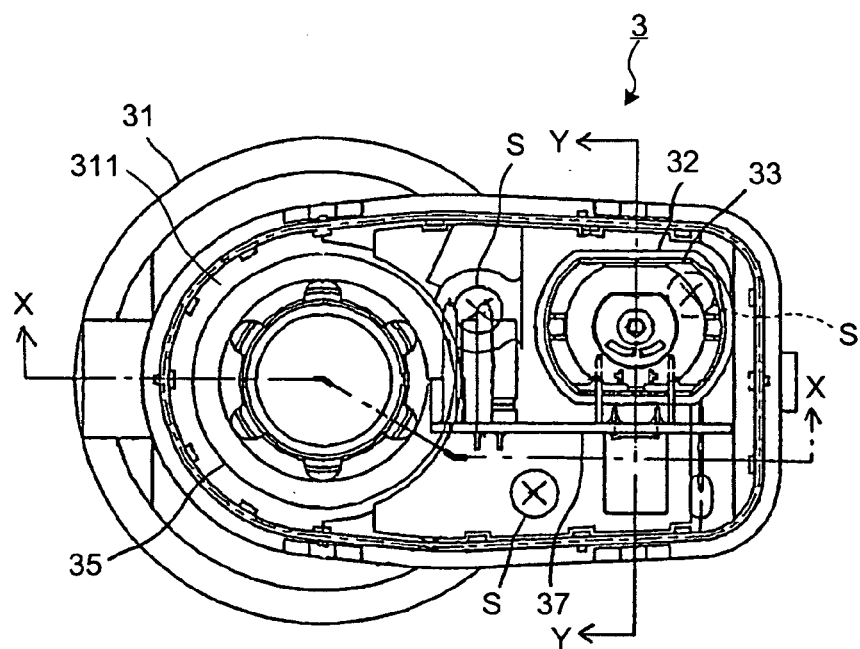
FIG. 1A is a top view of a door mirror that includes a motor driving unit according to an embodiment of the present invention.
Figure 1B:
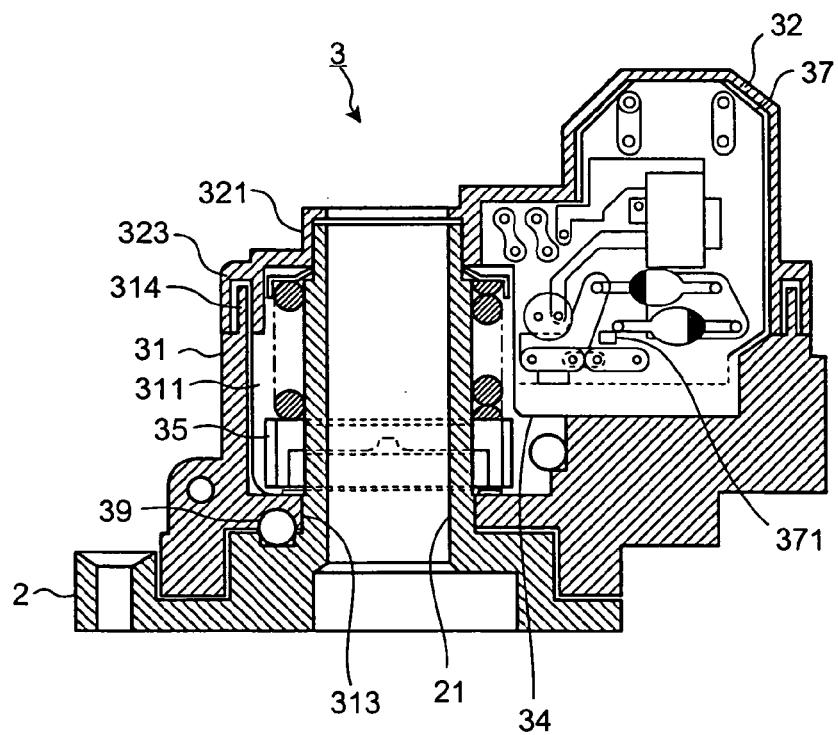
FIG. 1B is a cross-sectional view of the motor driving unit along line X-X in FIG. 1A.
Figure 2:
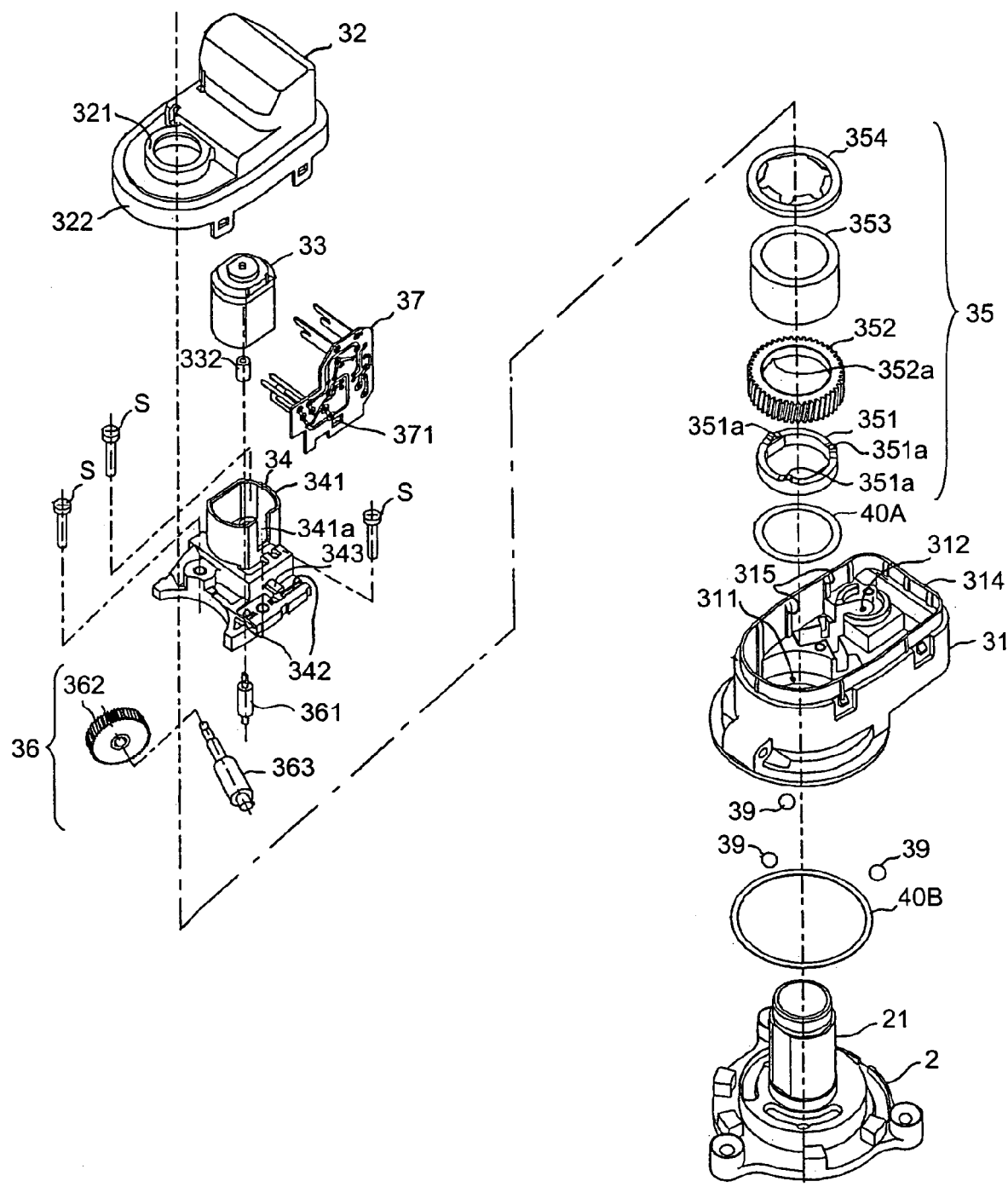
FIG. 2 is an exploded perspective view of a door mirror according to a first embodiment and a second embodiment according to the present invention.

The door mirror according to the first embodiment includes a motor driving unit 3 shown in FIG. 1A. FIGS. 1A, 1B, and 2 depict the structure of the motor driving unit 3.

The motor driving unit 3 includes a gear case 31 and a cover 32. A space in the gear case 31, which is covered by the cover 32, includes an electric motor 33 which drives the unit, a motor case 34 that holds the electric motor 33, a power transmission mechanism (a clutch mechanism 35 and a speed reduction mechanism 36) that transmits the driving force of the electric motor 33, and a switching circuit board 37 (a motor drive control circuit board on which a motor drive control circuit is mounted) on which a switching circuit is mounted.

To start with, a housing 311 for the clutch mechanism 35 and a housing 312 for the speed reduction mechanism 36 are disposed in parallel and the clutch mechanism 35 and the speed reduction mechanism 36 are installed in the housing 311 and the housing 312 respectively.

A hole 313 is cut through a bottom portion of the housing 311 of the clutch mechanism 35 to insert a shaft 21 shown in FIG. 1B. The clutch mechanism 35 is fixed to the shaft 21 in the hole 313 through a washer 40A shown in FIG. 2.

The motor case 34 is fixed to the gear case 31 to cover an opening of the housing 312 of the speed reduction mechanism 36.

The following is a description of the motor case 34. The motor case 34 includes a mounting base 341 for the electric motor 33 (hereinafter, "motor mounting base"). The motor mounting base 341 is a cylindrical outer wall that has a shape similar to an outer shape of the electric motor 33. The electric motor 33 is accommodated and held inside this cylindrical outer wall. A notch 341a shown in FIG. 2 is cut on a portion facing the switching circuit board 37 in the outer wall, which is described later.

Figure 1C:
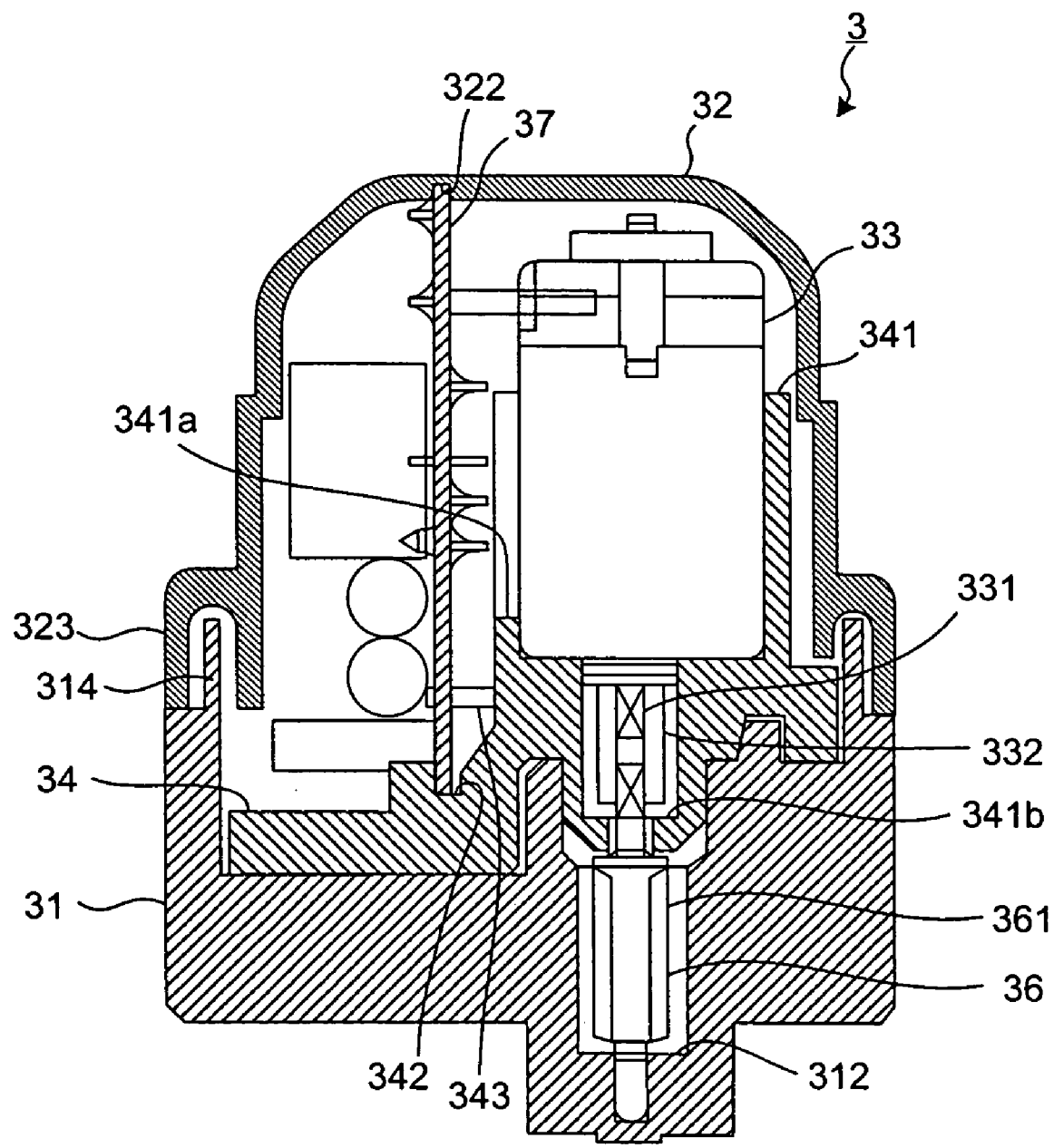
FIG. 1C is a cross-sectional view of the motor driving unit along line Y-Y in FIG. 1A.

An output shaft 331 of the electric motor 33 is coupled with a first worm gear 361 of the speed reduction mechanism 36 via a joint 332. For this reason, a hole 341b shown in FIG. 1C is cut through a bottom portion of the motor mounting base 341 to insert the output shaft 331 and the joint 332. The hole 341b is cut such that it continues through the housing 312 of the speed reduction mechanism 36.

A groove 342 in which a bottom edge of the switching circuit board 37 is inserted, and a claw 343 that is inserted through a hole 371 of the switching circuit board 37 as shown in FIGS. 1C and 2, are cut in the motor case 34. The switching circuit board 37 is held by the motor case 34 with the groove 342, the claw 343, and a groove 322 in the cover 32 shown in FIG. 1C.

Figure 3:
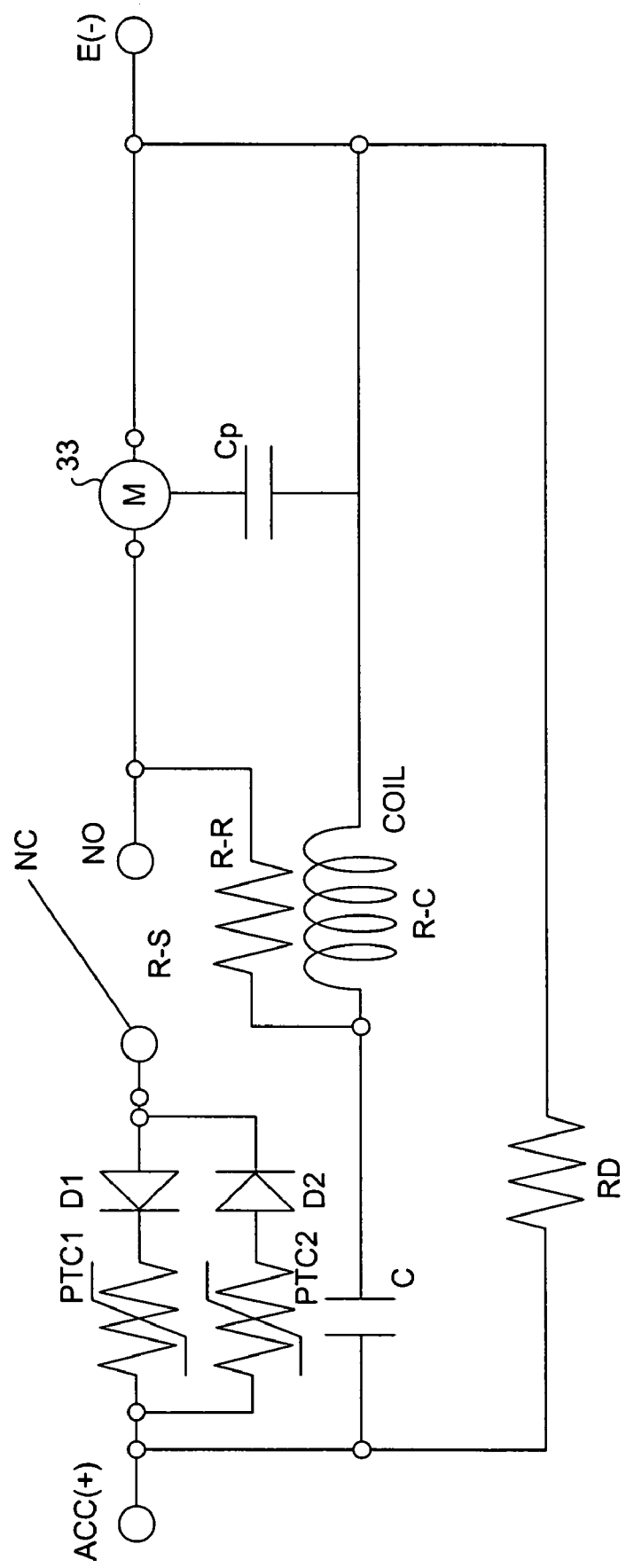
FIG. 3 is a circuit diagram of a switching circuit in the motor driving unit according to the first embodiment.

The switching circuit that is mounted on the switching circuit board 37 includes a first PTC element PTC1, a second PTC element PTC2, a first diode D1, a second diode D2, a relay contact R-S, a start-up condenser C, a relay self-holding resistance R-R, a relay coil R-C, and a discharge resistance RD as shown in FIG. 3. Moreover, the switching circuit is connected electrically to a power supply side ACC (+) and an earthing (−) side via a retraction control switch and a harness, which are not shown in the diagram. The retraction control switch is for switching to the standing position or to the retracted position and is disposed in the interior of the vehicle.

Figure 4:
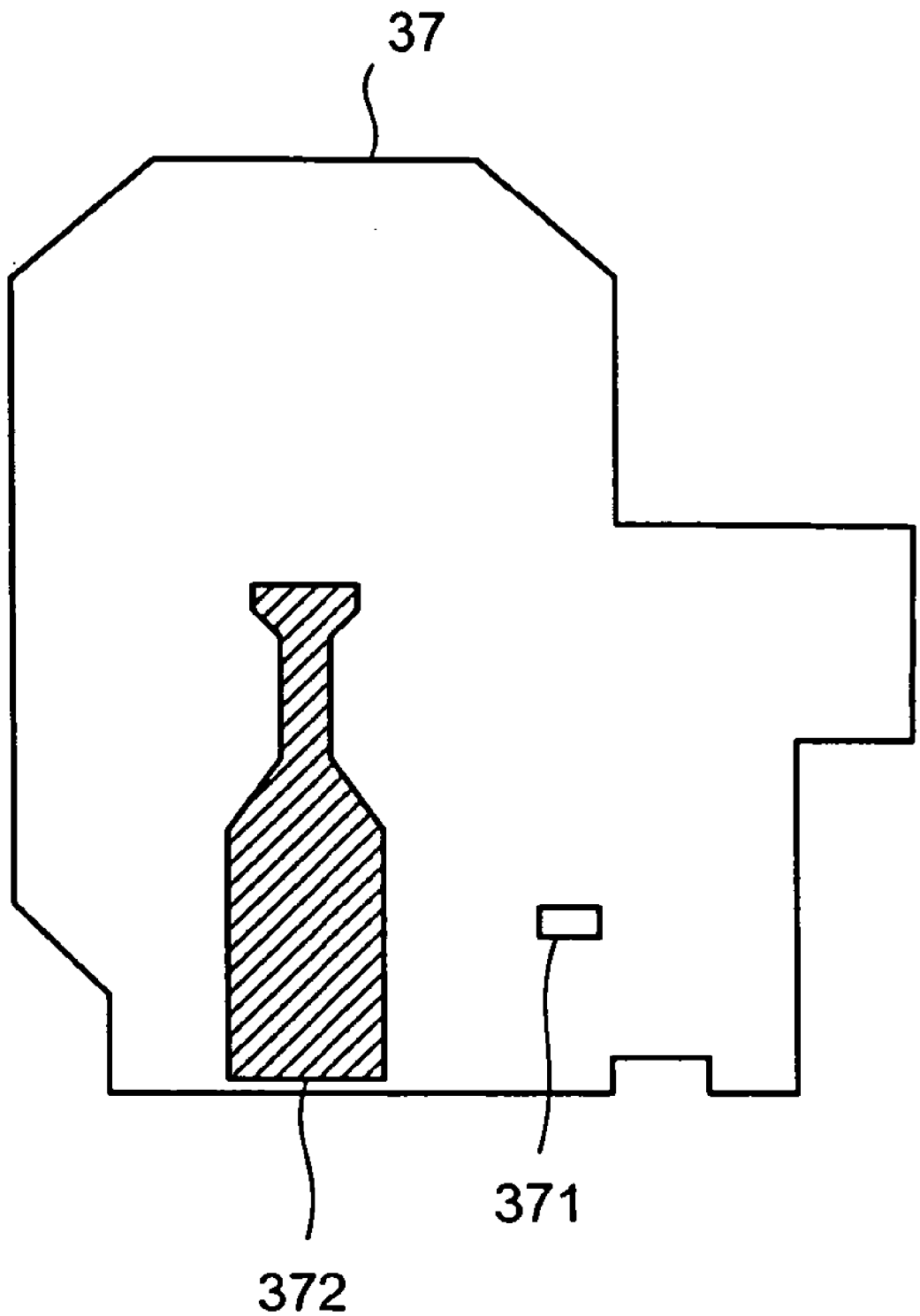
FIG. 4 is a schematic diagram of a switching circuit board in the motor driving unit according to the first embodiment as seen from an electric motor.

The switching circuit board 37 according to the first embodiment is provided with a conductor pattern 372 that is disposed in a position facing a metal case of the electric motor 33 as shown in FIG. 4. The conductor pattern 372 faces the metal case such that it is at a predetermined distance from the metal case of the electric motor 33 via at least the notch 341a in the motor case 34. The conductor pattern 372 is connected electrically to an earthing (−) side of the relay coil R-C according to the first embodiment. Thus, the conductor pattern 372, the metal case, and a dielectric substance (air) between these two form a pseudo condenser Cp shown in FIG. 3.

In the switching circuit board 37 shown in FIG. 4, for the sake of convenience of description, a switching circuit structure of components such as resistance that are mounted, is not shown in the diagram.

According to the first embodiment, the pseudo condenser Cp is provided between the electric motor 33 and the switching circuit (in this case, between the relay coil R-C and the earthing (−) side). Therefore, if there is a momentary voltage fluctuation in the electric motor 33 at the time of start up of drive of the electric motor 33, an electric charge equivalent to the voltage fluctuation is stored in the pseudo condenser Cp. By absorption of the voltage fluctuation by the pseudo condenser Cp, induced noise that is generated from the electric motor 33 is absorbed, thereby enabling to reduce or eliminate such induced noise.

Normally, larger is the electrostatic capacity of the condenser, better is the noise absorption. The electrostatic capacity is proportional to an area of the conductors facing each other and increases in inverse proportion with a distance between the conductors. Therefore, to achieve effective absorption by the pseudo condenser Cp according to the first embodiment, it is desirable to increase area of the conductor pattern 372 and the notch 341a, as well as to decrease the distance (the predetermined distance) between the electric motor 33 and the conductor pattern 372.

The motor case 34 is fitted inside an outer wall 314 of the gear case 31 and is fixed with a screw S.

The clutch mechanism 35 includes a clutch holder 351, a clutch gear 352, a spring 353, and a push nut 354 as shown in FIG. 2. The clutch mechanism is formed by fitting the washer 40A, the clutch holder 351, the clutch gear 352, and the spring 353 one after another on the shaft 21 that is inserted in the housing 311 of the gear case 31 and by compressing the spring 353 with the push nut 354. While doing so, protruding portions 351a that are formed on a top surface of the clutch holder 351 are engaged with recesses 352a formed on a bottom surface of the clutch gear 352.

The speed reduction mechanism 36 includes the first worm gear 361 that is coupled with the output shaft 331 of the electric motor 33 via the joint 332, a helical gear 362 that is engaged with the first worm gear 361, and a second worm gear 363 that is engaged with the helical gear 362. The second worm gear 363 is engaged with the clutch gear 352 of the clutch mechanism.

The driving force of the electric motor 33 is transmitted to the shaft 21 via the clutch mechanism 35 and the speed reduction mechanism 36.

The cover 32 is fixed to the gear case 31 that is equipped with various components. A cylindrical part 321 with it's both ends open, is formed on the cover 32 at a position opposite to the hole 313 that is cut through the gear case 31. An inner wall of the cylindrical part 321 functions as a bearing of the shaft 21 and the cylindrical part 321 also functions as an inserting hole for the harness that is not shown in the diagram. The harness is also inserted through the shaft 21 that is hollow.

The groove 322 shown in FIG. 1C in which at least a top edge of the switching circuit board 37 is fitted, is cut on an inner side of the cover 32. The groove 322 may be cut such that a side edge and an inclined edge of the switching circuit board 37, which are not shown in the diagram, are fitted in it.

Thus, the cover 32 structured in such a manner has the switching circuit board 37 fitted in the groove 322 on the inner side as well as an outer wall 323 of it's bottom edge fitted into the outer wall 314 of the gear case 31. The cover 32 can be fixed by any method, such as hot melting or screwing.

Thus the motor driving unit 3 is rotatably pivoted by the shaft 21 that is held by the shaft holder 2 via a ball 39 and a washer 40B shown in FIG. 2, and rotates the mirror assembly.

An operation of the powered retractable door mirror according to the first embodiment is described below.

When an operator operates the retraction control switch (not shown in the diagram) that is provided in the interior of the vehicle, the electric motor 33 of the motor driving unit 3 is driven. The driving force of the electric motor 33 is transmitted via the output shaft 331 of the motor, the joint 332, and the speed reduction mechanism 36, to the clutch gear 352 that is fixed to the shaft 21.

While the driving force of the electric motor 33 is transmitted to the clutch gear 352, since the clutch gear 352 in the motor driving unit 3 cannot rotate with respect to the shaft 21, the second worm gear 363 of the speed reduction mechanism 36 rotates around the clutch gear 352 as a center. The rotation of the second worm gear 363 causes the mirror assembly included in the motor driving unit 3 (components such as a housing 4, a fixing bracket 5, and a mirror 6 included in the motor driving unit 3) to rotate around the shaft 21 as a center.

When the mirror assembly reaches the standing position or the retracted position, the power supply to the electric motor 33 is cut off by switching operation of the switching circuit and the mirror assembly stops at the predetermined position.

If the transmission power from the electric motor 33 is in excess or if there is an impact on the mirror assembly, the clutch gear 352 rotates while resisting thrust exerted by the spring 353, and the protruding portions 351a on the clutch holder 351 and the recesses 352a on the clutch gear 352 are disengaged. Due to this, the load on the electric motor 33 is released, thereby avoiding any damage.

At the start-up of the electric motor 33, the voltage in the electric motor 33 fluctuates momentarily. When the voltage fluctuates, according to the first embodiment, the electric charge equivalent to the voltage fluctuation is stored in the pseudo condenser Cp, thereby enabling to reduce or to eliminate the induced noise generated from the electric motor 33.

Thus, according to the first embodiment, the induced noise from the electric motor 33 can be reduced or eliminated near the electric motor 33 and any adverse effect on the peripheral equipment installed in the vehicle can be avoided. This allows better reception of signal by the radio and the television, and enables to prevent malfunctioning of the ECU.

A second embodiment of the motor driving unit according to the present invention is described below with reference to FIG. 5. The motor driving unit used in the powered retractable door mirror according to the second embodiment is described below.

Figure 5:
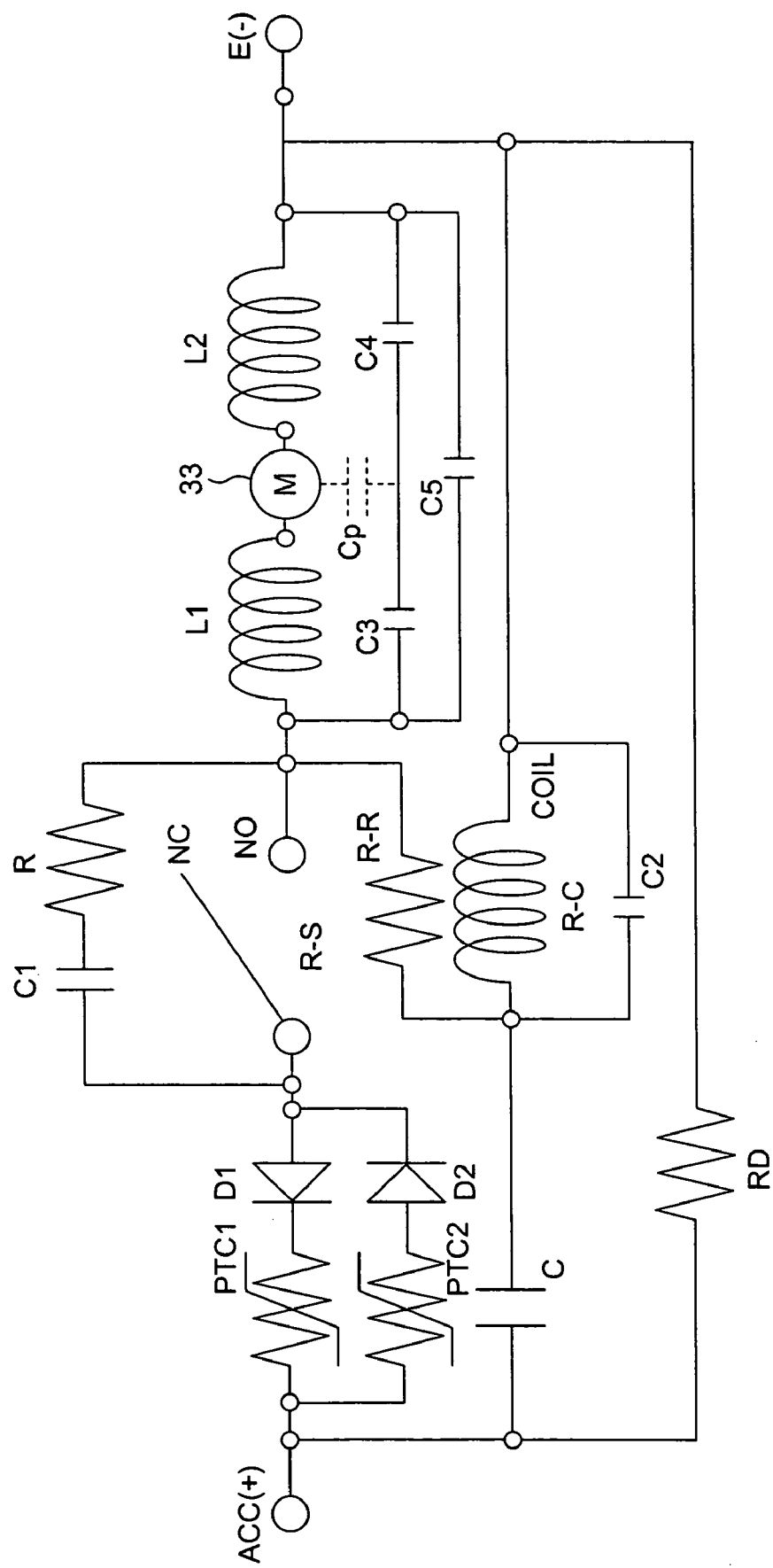
FIG. 5 is a circuit diagram of the switching circuit in the motor driving unit according to the second embodiment.

The powered retractable door mirror according to the second embodiment includes the motor driving unit 3 provided in the powered retractable door mirror according to the first embodiment with a change incorporated in the switching circuit as shown in FIG. 5.

A switching circuit mounted on the switching circuit board according to the second embodiment is provided with an additional circuit structure, which is a following noise-eliminating device, added to the components of the inductive load system in the switching circuit shown in FIG. 3 according to the first embodiment.

To start with, the relay contact R-S is provided as shown in FIG. 5 as a component of the inductive load system and at a time of ON/OFF, a counter electromotive force is generated in this relay contact R-S, thereby causing the induced noise of high frequency. For this reason, according to the second embodiment, a combination of a condenser C1 and a resistance R, which are connected in series, is provided in parallel to the relay contact R-S to reduce or to eliminate the induced noise that is generated.

Moreover, the relay coil R-C is connected as a component of the inductive load system as shown in FIG. 5, and the induced noise of high frequency is generated in this relay coil R-C as well. For this reason, according to the second embodiment, a condenser C2 is connected in parallel with the relay coil R-C as shown in FIG. 5 to reduce or to eliminate the induced noise that is generated.

Furthermore, as described in the first embodiment, the induced noise is also generated from the electric motor 33 which is a component of the inductive load system. To deal with this, according to the second embodiment, a coil L1 is connected in series to a power supply ACC (+) side of the electric motor and a coil L2 is connected in series to an earthing (−) side of the electric motor 33. The coils L1 and L2 connected in such a manner, convert the induced noise generated from to electric motor to heat energy, thereby reducing or eliminating the induced noise. Instead of using the two coils L1 and L2 for the reduction or elimination of the induced noise, any one of the coils may also be used.

According to the second embodiment, the coils L1 and L2 are connected in series and condensers C3, C4, and C5 are connected in parallel, which reduce or eliminate the induced noise generated in the electric motor 33.

According to the second embodiment, a pseudo condenser Cp is formed between the electric motor 33 and the conductor pattern 372. The conductor pattern 372 is connected electrically between the condenser C3 and C4, thereby forming the pseudo condenser Cp as shown in FIG. 5.

Thus, according to the second embodiment, the pseudo condenser Cp not only reduces or eliminates the induced noise as according the first embodiment, but can reduce or eliminate the induced noise in an effective manner because of the coils L1 and L2 and the condensers C3, C4, and C5. Moreover, the switching circuit according the second embodiment is provided with a noise eliminating device for each inductive load system, which enables to reduce or to eliminate the induced noise in the circuit.

Further, according to the second embodiment, the noise eliminating device is provided for each inductive load system. However, it is not necessary to provide the noise eliminating device for each of the inductive load systems and may be provided according the requirement of level of reduction or elimination. In other words, the noise eliminating device may be provided to at least any one of the inductive load systems.

A third embodiment of the motor driving unit according to the present invention is described below with reference to FIGS. 6 to 8. The motor driving unit used in the powered retractable door mirror according the third embodiment is described below.

Figure 6:
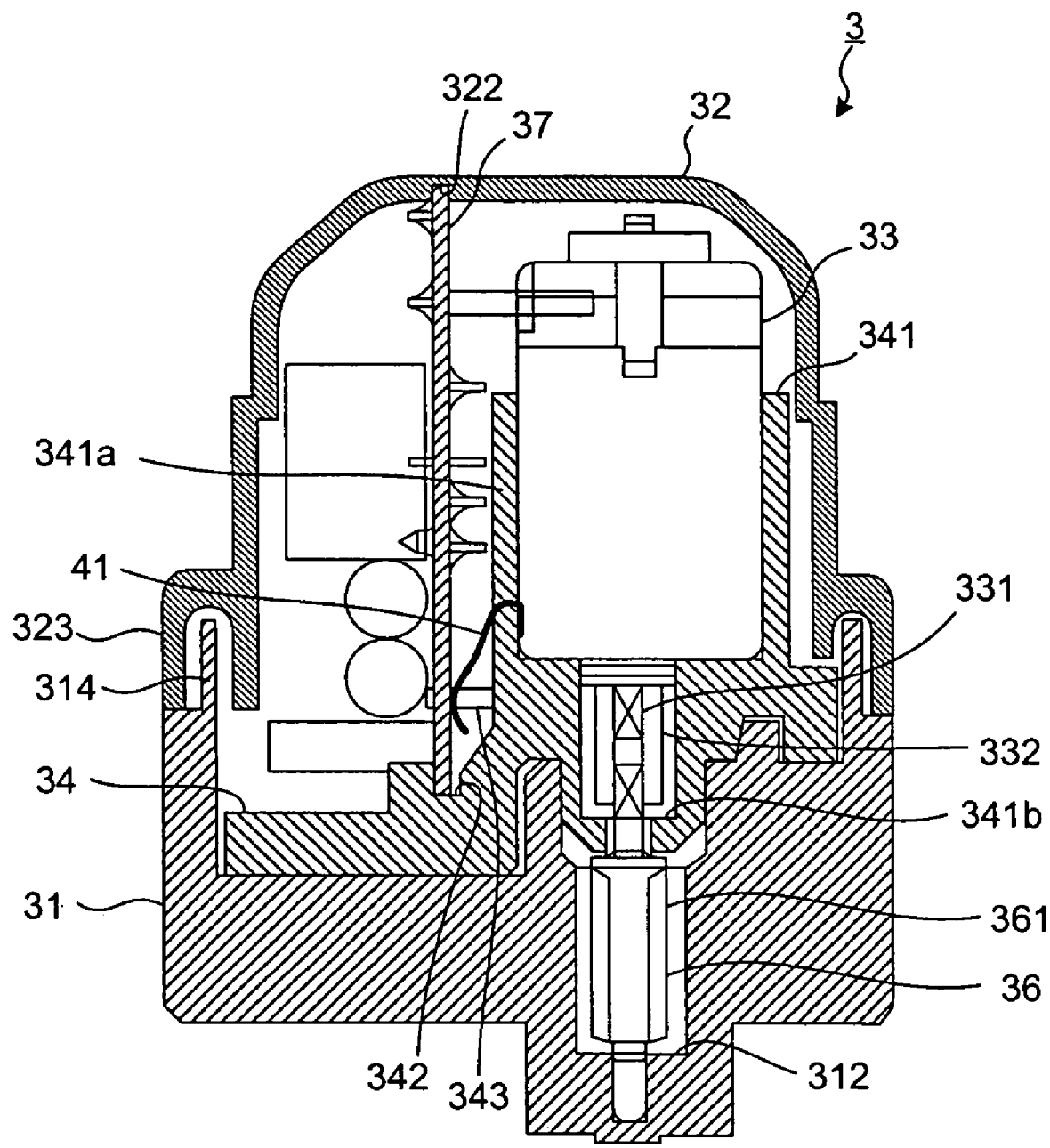
FIG. 6 is an enlarged cross-sectional view of a motor driving unit according to a third embodiment and a fourth embodiment.
Figure 7:
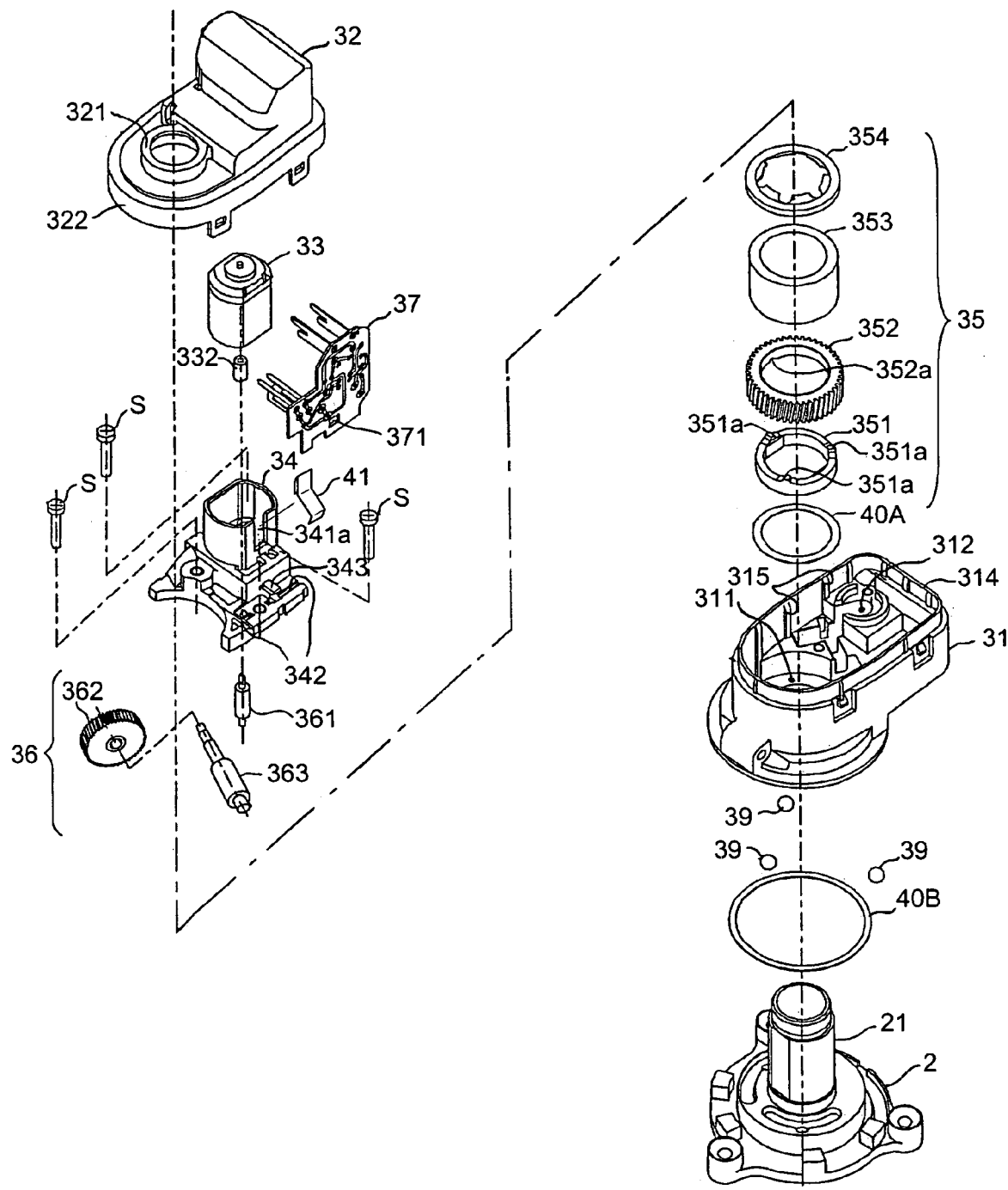
FIG. 7 is an exploded perspective view of a door mirror according to the third embodiment and the fourth embodiment.
Figure 8:
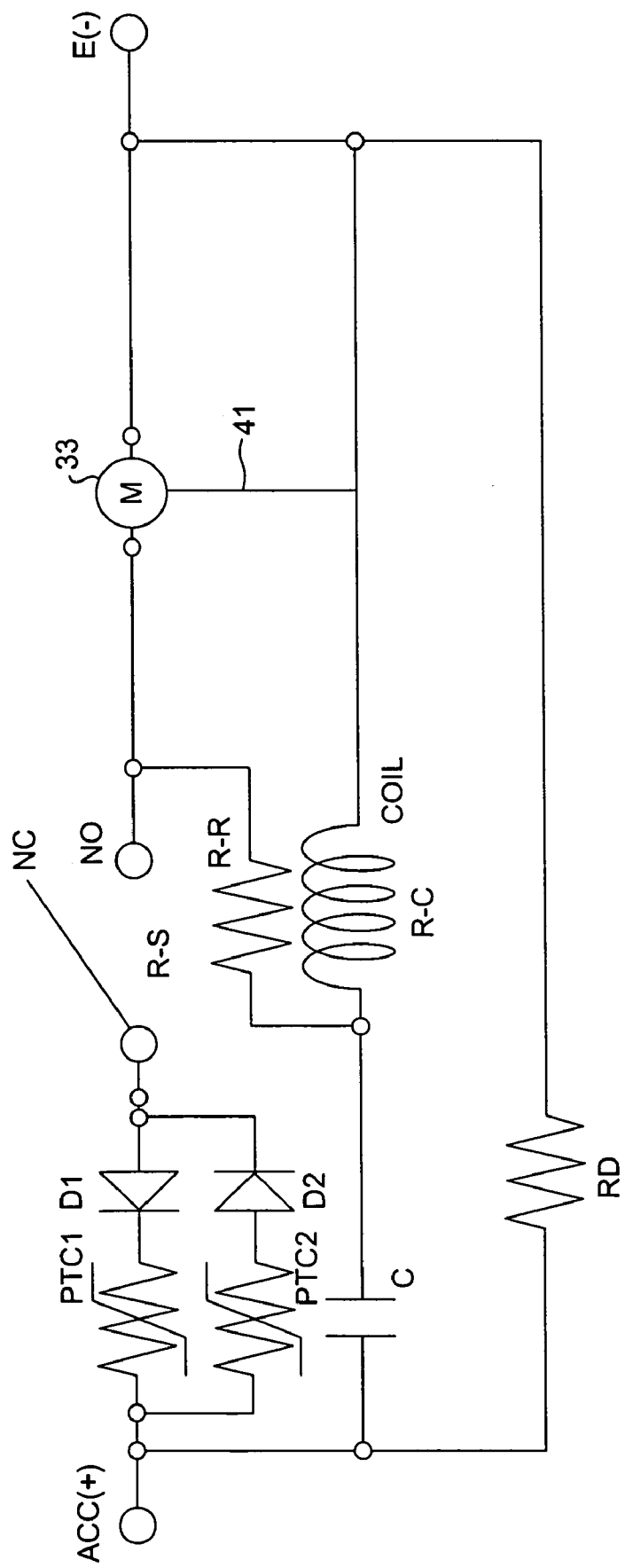
FIG. 8 is a circuit diagram of a switching circuit in the motor driving unit according to the third embodiment.

The powered retractable door mirror according to the third embodiment includes the motor driving unit 3 according to the first embodiment with a provision of a short-circuiting device 41 shown in FIGS. 6 and 7. The short-circuiting device 41 allows conduction between the metal case of the electric motor 33 and the conductor pattern 372 in the switching circuit board 37. According to the third embodiment, a pressure welded spring that is made of a conductive material such as a metal that is pressure welded by bending between the metal case of the electric motor 33 and the conductor pattern 372 in the switching circuit board 37, is used as the short-circuiting device 41. A switching circuit according to the third embodiment, which is provided with the short-circuiting device 41, is as shown in FIG. 8.

Thus, by providing the short-circuiting device 41 that is connected electrically the induced noise generated from the electric motor can be reduced or eliminated.

Figure 9:
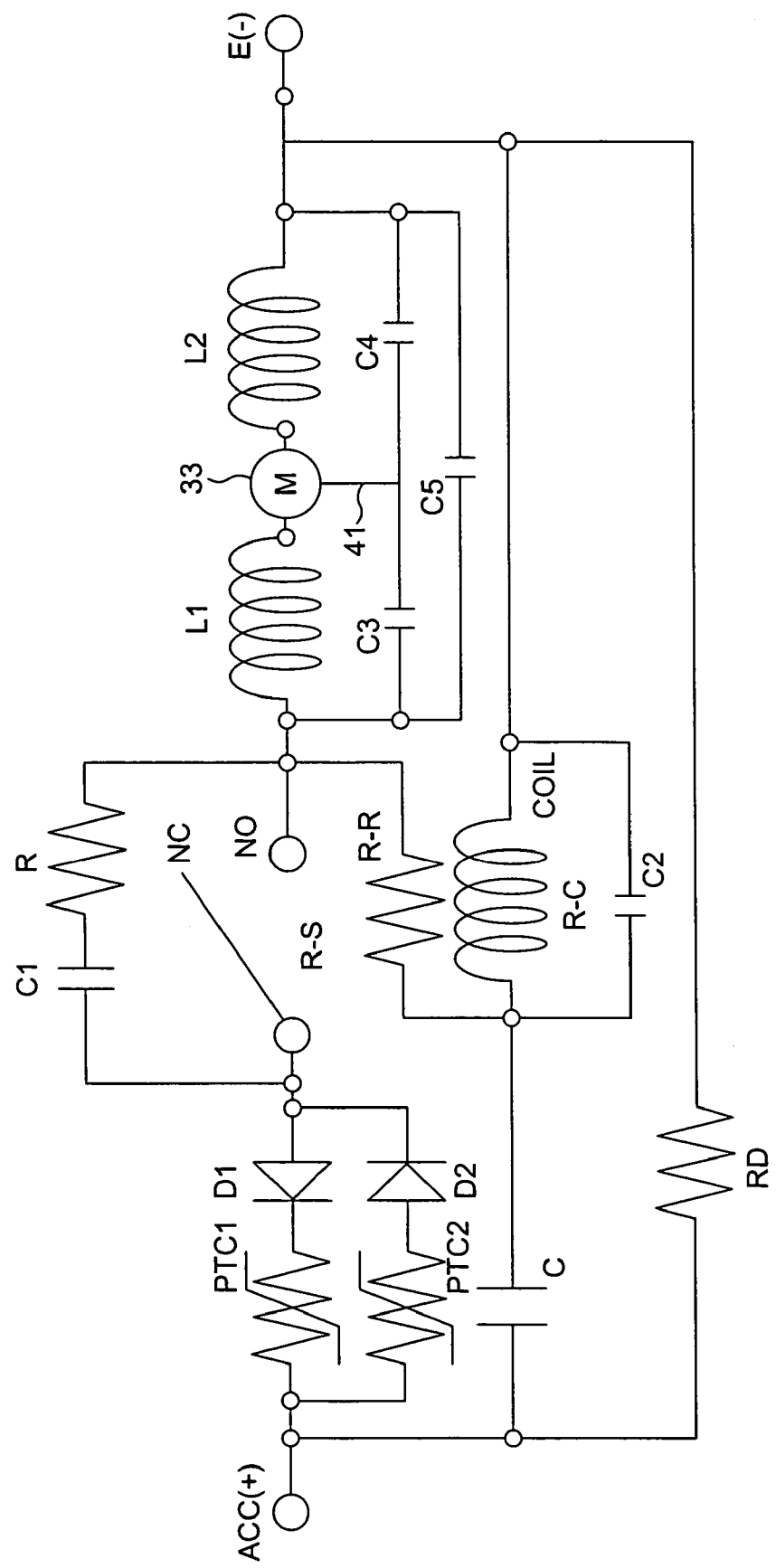
FIG. 9 is a circuit diagram of a switching circuit in the motor driving unit according to the fourth embodiment.
Figure 10:
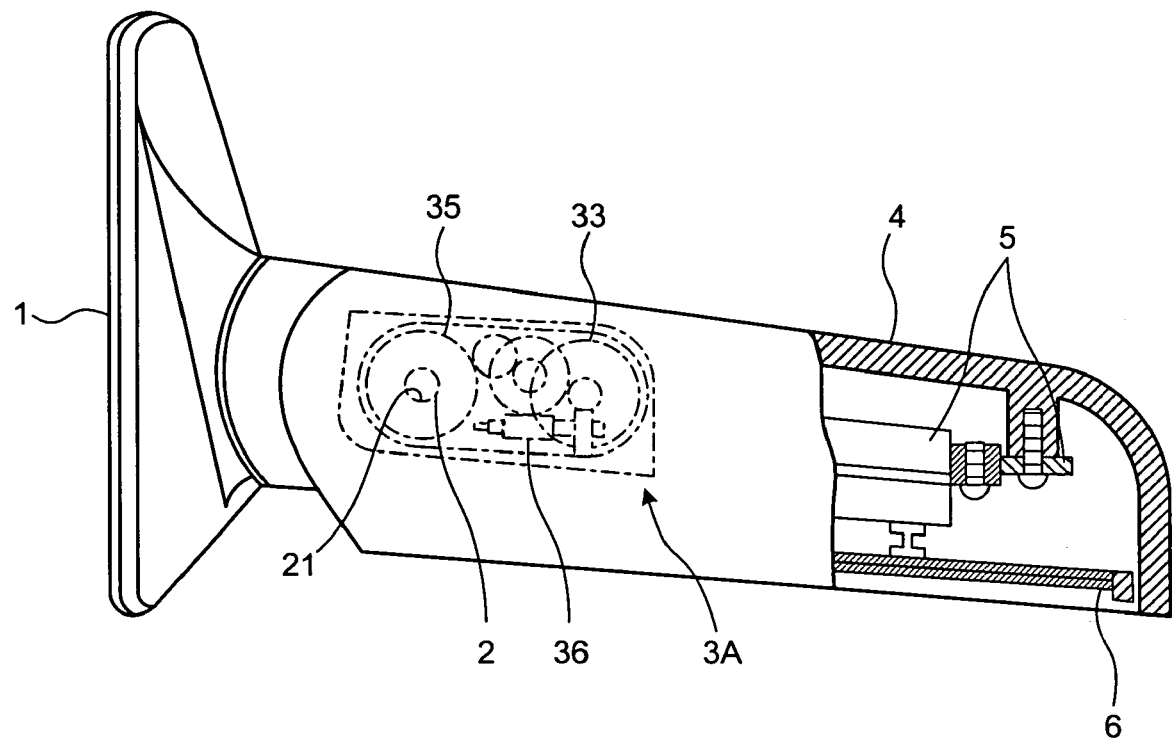
FIG. 10 is a partial cross-sectional view of a conventional door mirror.
Figure 11:
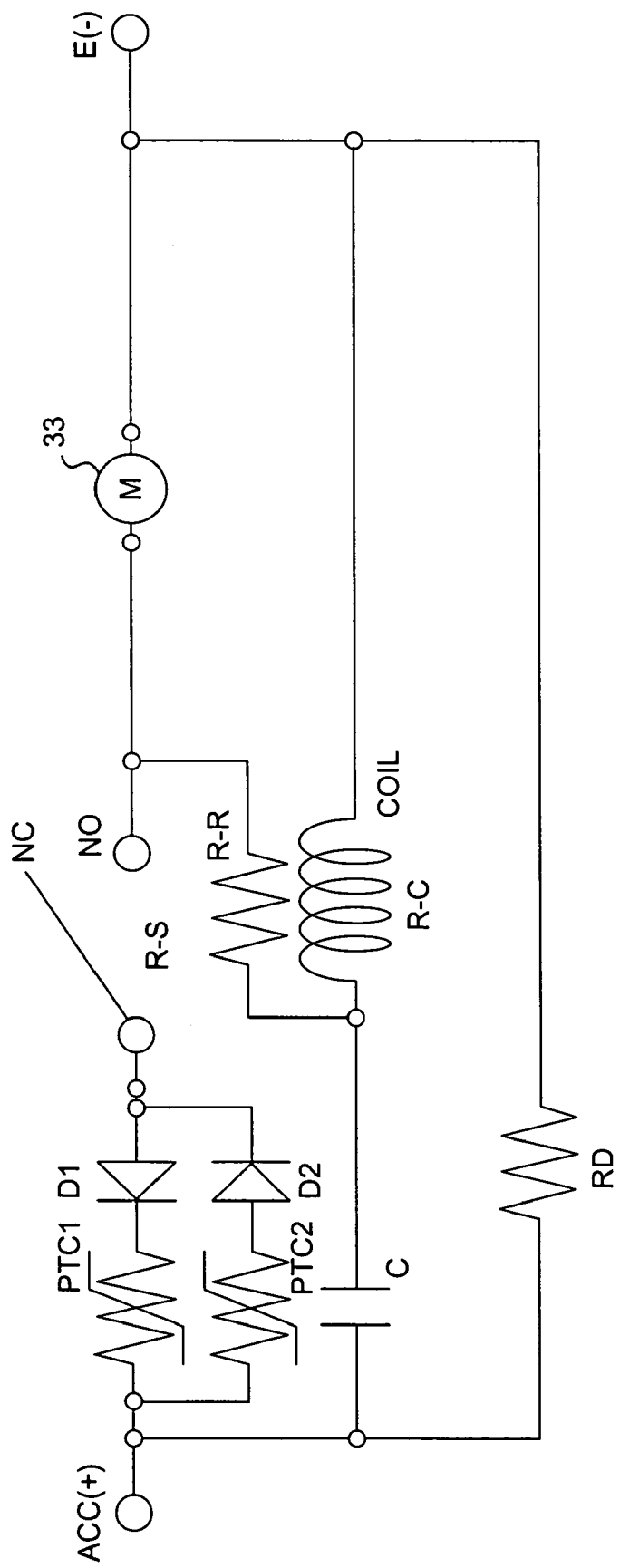
FIG. 11 is a circuit diagram of a switching circuit of a motor driving unit in the conventional door mirror.

A fourth embodiment of the motor driving unit according to the present invention is described below with reference to FIGS. 6, 7, and 9. The motor driving unit used in the powered retractable door mirror according to the fourth embodiment is described below.

The powered retractable door mirror according to the fourth embodiment includes the motor driving unit 3 according to the second embodiment with a provision of the short-circuiting device 41 according to the third embodiment. A switching circuit according to the fourth embodiment that includes the short-circuiting device 41 is as shown in FIG. 9. This enables to reduce or to eliminate the induced noise in each inductive load system according to the second embodiment as well as to reduce or to eliminate the induced noise generated from the electric motor 33 by the short-circuiting device 41.

The motor driving unit is assumed to be used in powered retractable door mirrors of vehicles. However, the motor driving unit according to the present invention can also be used as a switching device of a power window of a vehicle or an expansion device of an antenna or a switching device of top light in a house.

According to the motor driving unit of the present invention, a pseudo condenser is formed by a conductor pattern of a motor drive control circuit and an electric motor facing each other. Therefore, when there is a momentary voltage fluctuation in the electric motor, an electric charge equivalent to the voltage fluctuation is stored in the pseudo condenser, which enables to reduce or eliminate the induced noise generated from the electric motor. Moreover, by providing the powered retractable door mirror with the motor driving unit, the induced noise that is generated from the powered retractable door mirror, is reduced or eliminated. This improves reception of signal by the radio or the television in the interior of the vehicle.

Thus, the motor driving unit according to the present invention is useful for reducing or eliminating the noise that is generated by the motor driving unit itself and in particular is suitable when equipment that are easily affected by noise are disposed nearby.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motor driving unit that drives an object to be driven, comprising:
   an electric motor that drives the object; and
   a circuit board that includes a control circuit that controls driving of the electric motor, wherein
   the electric motor and the circuit board are disposed with a predetermined distance therebetween in such a manner that the electric motor and the circuit board oppose each other, and
   the circuit board comprises a conductor pattern which is arranged to form a pseudo condenser with a metal casing of the electric motor.

2. The motor driving unit according to claim 1, wherein the pseudo condenser is provided between the electric motor and the control circuit.

3. The motor driving unit according to claim 1,
   wherein the casing accommodates the electric motor and has a notch on an outer wall that is between the conductor pattern and the electric motor.

4. The motor driving unit according to claim 1, further comprising a noise-eliminating device that eliminates noise produced by components of other inductive load system in the control circuit.

5. A motor driving unit that drives an object to be driven, comprising:
   an electric motor that drives the object;
   a circuit board that includes a control circuit that controls driving of the electric motor, wherein
   the electric motor and the circuit board are disposed with a predetermined distance therebetween in such a manner that the electric motor and the circuit board oppose each other, and
   the circuit board comprises a conductor pattern which is arranged to form part of a pseudo condenser, wherein the pseudo condenser is disposed at a position facing the electric motor; and
   a short-circuiting device that allows conduction between the electric motor and the conductor pattern.

6. A powered retractable door mirror comprising:
   a mirror assembly; and
   a motor driving unit that drives the mirror assembly and includes an electric motor, a circuit board that includes a control circuit that controls driving of the electric motor, wherein the electric motor and the circuit board are disposed with a predetermined distance therebetween in such a manner that the electric motor and the circuit board oppose each other, and the circuit board comprises a conductor pattern which is arranged to form a pseudo condenser with a metal case of the electric motor.

7. The powered retractable door mirror according to claim 6, wherein the pseudo condenser is provided between the electric motor and the control circuit.

8. The powered retractable door mirror according to claim 6, wherein the casing accommodates the electric motor and has a notch on an outer wall that is between the conductor pattern and the electric motor.

9. The powered retractable door mirror according to claim 6, further comprising a noise-eliminating device that eliminates noise produced by components of other inductive load system in the control circuit.

10. A powered retractable door mirror comprising:

a mirror assembly;

a motor driving unit that drives the mirror assembly and includes an electric motor, a circuit board that includes a control circuit that controls driving of the electric motor, wherein the electric motor and the circuit board are disposed with a predetermined distance therebetween in such a manner that the electric motor and the circuit board oppose each other, and the circuit board comprises a conductor pattern which is arranged to form part of a pseudo condenser, wherein the pseudo condenser is disposed at a position facing the electric motor; and a short-circuiting device that allows conduction between the electric motor and the conductor pattern.

* * * * *